No. 710,900. Patented Oct. 7, 1902.
F. A. SMITH.
LAWN RAKE.
(Application filed July 5, 1902.)

(No Model.)

WITNESSES
Chas. L. Hyde.
M. C. Nickilson.

INVENTOR
Ferdinand A. Smith
BY Hazard & Harpham
ATTORNEYS.

UNITED STATES PATENT OFFICE.

FERDINAND A. SMITH, OF LOS ANGELES, CALIFORNIA.

LAWN-RAKE.

SPECIFICATION forming part of Letters Patent No. 710,900, dated October 7, 1902.

Application filed July 5, 1902. Serial No. 114,487. (No model.)

*To all whom it may concern:*

Be it known that I, FERDINAND A. SMITH, a citizen of the United States, residing at Los Angeles, in the county of Los Angeles and State of California, have invented new and useful Improvements in Lawn-Rakes, of which the following is a specification.

The object of my invention is to put an attachment on a rake which can be set so it will automatically discharge the substance being raked from the teeth of the rake upon the removal of the usual pressure placed thereon while the rake is being drawn toward the person using it. I accomplish this object by means of the device described herein and shown in the accompanying drawings, in which—

Figure 1:
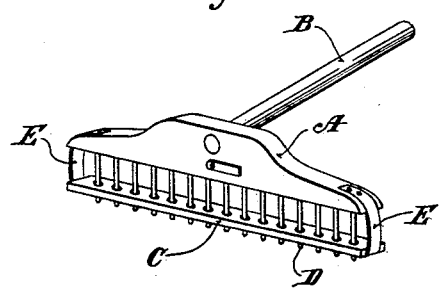
Figure 2:
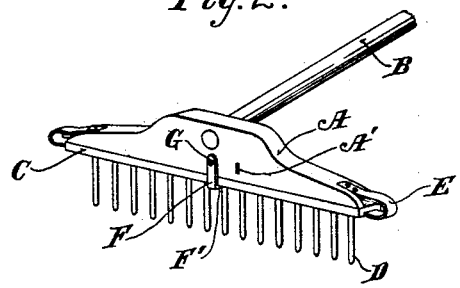

Figure 1 is a perspective view of a rake embodying my invention, my attachment being shown in its operative position. Fig. 2 is a perspective view of a rake embodying my invention, the unloader-bar being locked to the head of the rake, placing my attachment in the inoperative position.

In the drawings, A is the head of the rake, and B is the handle thereof.

C is the unloader-bar, through which the teeth D project, the bar having a reciprocating motion on the teeth, as follows: The end springs F, rigidly secured to the ends of the head on the upper side thereof and to the ends of the unloader-bar on the bottom side thereof, will tend to hold the unloader-bar in its depressed or operative position, as shown in Fig. 1, and while in this position will cause any substance tangled in or engaging the teeth to be removed therefrom when the downward pressure which is usual when drawing the rake forward is removed.

A rake having my attachment placed thereon will automatically unload itself at the end of every stroke thereof, and thereby grass or other substance cannot become entangled thereon. The unloader-bar will be elevated against the spring and toward the head of the rake in proportion to the pressure placed on the handle of the rake. When this pressure is removed, which happens at the end of the stroke, the head will be elevated by the resiliency of the springs until the rake will assume the position shown in Fig. 1, discharging all substances that may have clung to the head or entangled in the teeth, so that as the rake is elevated and moved forward to make another stroke everything gathered by the rake will be dropped at the end of the stroke next to the operator, being the point where the pressure was removed from the rake, and the rake elevated to make a new stroke. This unloader-bar may be locked into the inoperative position shown in Fig. 2—that is, to a position in contact with the head of the rake— and while it is in this position a rake provided with my improvement will operate like the ordinary rake and not be self-discharging. I provide means to lock the unloader-bar into this position, as follows: the resilient catch F, screwed or attached to the head of the rake, as at G, having an inwardly-turned portion F', forming a catch, which will hold the parts in the locked position by passing this catch under the unloader-bar, as shown in Fig. 2. A recess A' in the head of the rake provides means to permit the hook to pass into the head and be held locked therein against accidental removal and out of the way while the rake is in the operative position. Other means besides the catch herein shown may be used to lock and unlock the unloader-bar, and I do not confine myself to this particular way of accomplishing the same.

Having described my invention, what I claim as new, and desire to secure by Letters Patent, is—

1. An unloader for rakes comprising a bar provided with holes for the reception of the teeth of the rake and having the teeth projecting therethrough; springs at each end thereof securing the same to the head of the rake, and means to set the bar and the head of the rake in contact when desired.

2. A rake having a head provided with a handle and teeth projecting therefrom in combination with an unloader-bar, the bar having holes for the reception of the teeth of the rake and springs at the end of the head of the rake and the head of the bar adapted to hold the rake and bar apart and to permit them to be pressed together, and means to hold the head and the bar together substantially as described.

3. Means to automatically remove the substance being raked from the teeth of the rake at the end of the stroke of the rake comprising an unloader-bar mounted below the head of the rake the teeth projecting therethrough, the said bar connected with the head of the rake by springs at each end of the bar, the said springs being also secured to the end of the head of the rake and means to hold the bar against the body of the rake as and for the purpose shown and described.

4. A lawn-rake provided with means to discharge from the teeth thereof the substance being raked at the end of every stroke of the rake, comprising an unloading-bar on the teeth, the teeth projecting therethrough, means to hold the bar in position adjacent to the ends of the teeth comprising springs securing the ends of the bar to the ends of the head of the rake, and means to hold the bar in contact with the body of the rake substantially as described.

5. The herein-described means to unload the substance being raked from the teeth of the rake, comprising the unloader-bar C, provided with holes for the passage therethrough of the teeth of the rake, the springs E connecting the bar to the head A of the rake and the catch F pivotally attached to the head of the rake, the free end being provided with a turned end forming a catch adapted when turned downwardly to engage the unloader-bar and hold the same in contact therewith and out of the way while the rake is in the operative position.

In witness that I claim the foregoing I have hereunto subscribed my name this 27th day of June, 1902.

FERDINAND A. SMITH.

Witnesses:
M. C. NICKELESON,
G. E. HARPHAM.